US012763473B2

(12) United States Patent
Chen et al.

(10) Patent No.: US 12,763,473 B2
(45) Date of Patent: Oct. 13, 2026

(54) PLANAR MONOPOLE LOOP COMPOSITE MULTI-BROADBAND ANTENNA

(71) Applicant: WIESON TECHNOLOGIES CO., LTD., New Taipei (TW)

(72) Inventors: I-Fong Chen, New Taipei (TW); Chia-Mei Peng, New Taipei (TW)

(73) Assignee: WIESON TECHNOLOGIES CO., LTD., New Taipei City (TW)

( * ) Notice: Subject to any disclaimer, the term of this patent is extended or adjusted under 35 U.S.C. 154(b) by 11 days.

(21) Appl. No.: 19/087,074

(22) Filed: Mar. 21, 2025

(65) Prior Publication Data

US 2026/0188909 A1 Jul. 2, 2026

(30) Foreign Application Priority Data

Dec. 30, 2024 (TW) ................................ 113214454

(51) Int. Cl.

| | |
|---|---|
| ***H01Q 9/30*** | (2006.01) |
| ***H01Q 5/50*** | (2015.01) |
| ***H01Q 7/00*** | (2006.01) |

(52) U.S. Cl.

CPC ................ *H01Q 9/30* (2013.01); *H01Q 5/50* (2015.01); *H01Q 7/00* (2013.01)

(58) Field of Classification Search

CPC .. H01Q 9/30; H01Q 5/50; H01Q 7/00; H01Q 1/36; H01Q 1/38; H01Q 9/42; H01Q 1/243; H01Q 9/0407; H01Q 5/371; H01Q 5/40

See application file for complete search history.

(56) References Cited

U.S. PATENT DOCUMENTS

| | | | | |
|---|---|---|---|---|
| 9,537,218 B2 * | 1/2017 | Lin | ........................ | H01Q 5/378 |
| 2014/0078010 A1 * | 3/2014 | Li | ........................ | H01Q 1/521<br>343/729 |
| 2015/0200456 A1 * | 7/2015 | You | ........................ | H01Q 9/42<br>343/750 |

* cited by examiner

*Primary Examiner* — David E Lotter

(74) *Attorney, Agent, or Firm* — MUNCY, GEISSLER, OLDS & LOWE, P.C.

(57) ABSTRACT

The present invention is a planar monopole loop composite multi-broadband antenna, which designs the ground wire into a loop shape, surrounding the asymmetric T-shaped monopole signal line to increase the path of the antenna surface current and create low-frequency resonant frequency band of the antenna. The antenna has the characteristics of a balanced antenna, and the radiation performance and bandwidth of the antenna are not affected when the ground plane changes Placing the signal line close to the ground line creates a coupling effect to increase the path of the antenna's surface current, thereby increasing the flatness of the antenna's high-frequency resonant frequency band impedance bandwidth.

10 Claims, 7 Drawing Sheets

Peak Gain : 3.26 dBi@2.45 GHz

Peak Gain：4.42 dBi@5.5 GHz

X-Y axis plane

Y-Z axis plane

Z-X axis plane

Peak Gain：4.59 dBi@6.5 GHz

PLANAR MONOPOLE LOOP COMPOSITE MULTI-BROADBAND ANTENNA

This application claims the priority benefit of Taiwan patent application number 113214454, filed on Dec. 30, 2024.

BACKGROUND OF THE INVENTION

1. Field of the Invention

The present invention relates to a planar monopole loop composite multi-broadband antenna, particularly a miniaturized multi-band and broadband antenna, and a composite antenna system having the performance of a balanced antenna. In the case where the space where the antenna can be installed is limited, it has an omnidirectional antenna radiation pattern and can overcome the problem that when the grounding area changes, the antenna's radiation performance and bandwidth will not be affected.

2. Description of the Related Art

Wireless communication technology is an indispensable part of today's convenient life. With the integrated deployment of wired and wireless LANs, mobile electronic devices must also be equipped with corresponding wireless antennas to receive and transmit signals, so that mobile electronic devices can use the Internet and transmit data through the wireless LAN (WLAN).

The wireless antenna of the above-mentioned mobile electronic device is usually a single body or integrated with other antennas with different functions. Its size is usually large and affects the circuit layout of the mobile electronic device. On the other hand, the operating bandwidth of wireless antennas is required to be designed towards multi-band and wideband frequency bands. Under the premise of not occupying too much space inside mobile electronic devices, how to provide more ideal multi-band and broadband antennas has become a goal that the industry is eager to work hard on.

SUMMARY OF THE INVENTION

Therefore, in view of the above problems and deficiencies, the inventor collected relevant information and, after multiple evaluations and considerations, designed the invention of this planar monopole loop composite multi-broadband antenna.

The main object of the present invention is to provide a planar monopole loop composite multi-broadband antenna, which comprises a carrier, a signal line and a loop grounding line. The signal line is in an asymmetric T-shape formed on the carrier. The signal line comprises a high frequency radiation portion, and a first signal line extending from the high frequency radiation portion and coupled to a grounding area, so that a feed point for welding a preset cable is formed at the coupling location. The loop grounding line is formed on the carrier. The loop grounding line comprises a multi-turn low/medium frequency radiation portion, which surrounds the signal line and comprises an outer loop transmission path and an inner loop transmission path located on one side of the outer loop transmission path and extending inwardly, and a second signal line and a third signal line respectively located at two ends of the outer loop transmission path and coupled to the grounding area. The loop grounding line surrounds the signal line to form a co-planar waveguide feeding-monopole antenna having dipole antenna characteristics.

Through the above, the antenna structure can be simple and the performance can be good. The antenna can be materialized by various methods such as using a flat printed circuit board, a plastic board or a three-dimensional antenna formed by metal wire cutting. Furthermore, the antenna has a single feed structure of a co-planar waveguide, and the ground wire is designed as a loop type, surrounding the monopole signal line to achieve broadband multi-band performance. In addition, it is easy to form a versatile antenna structure, so that good antenna radiation performance can be achieved when the space where the antenna can be installed is limited; and the applicable frequency range is extremely wide, from the MHz level to the mmWave level.

Preferably, the top side of the high frequency radiation portion of the signal line has a top-loading portion capable of adjusting impedance matching and bandwidth of a high-frequency resonant frequency band, and the top-loading portion has a rectangular structure.

Preferably, the first signal line of the signal line extends vertically and has an open stub for adjusting impedance matching and bandwidth of a high-frequency resonant frequency band.

Preferably, the inner loop transmission path of the loop grounding line has an adjustment area capable of adjusting impedance matching and bandwidth of a low-frequency resonant frequency band, and the adjustment area has a rectangular structure.

Preferably, the low-frequency signal transmission path of the loop grounding line completes low-frequency signal transmission via the second signal line, the outer loop transmission path approximately in the shape of a "⊓", the inner loop transmission path approximately in the shape of an inverted "C", and the third signal line in sequence.

Preferably, the medium frequency signal transmission path of the loop grounding line completes medium frequency signal transmission via the second signal line, the outer loop transmission path approximately in the shape of a "⊓" and the third signal line in sequence, and a radiation guide point is formed at each of the two intersections of the outer loop transmission path and the inner loop transmission path, so that wireless signal hopping is transmitted through the two radiation guide points to form electronic signal transmission in the outer loop transmission path without through the inner loop transmission path.

Preferably, the signal line is formed between two side lines of the outer loop transmission path and in a space formed below the inner loop transmission path, and the first signal line, the second signal line and the third signal line are coupled with the grounding area to form a co-planar waveguide feed, wherein the first signal line forms a live wire that is charged and the second signal line and the third signal line form a ground wire, which is not charged.

DETAILED DESCRIPTION OF THE PREFERRED EMBODIMENT

In order to achieve the above-mentioned purpose and effect, the technical means and structure adopted by the present invention are described in detail with reference to the preferred embodiment of the present invention, and its features and functions are as follows for a complete understanding.

Figure 1:
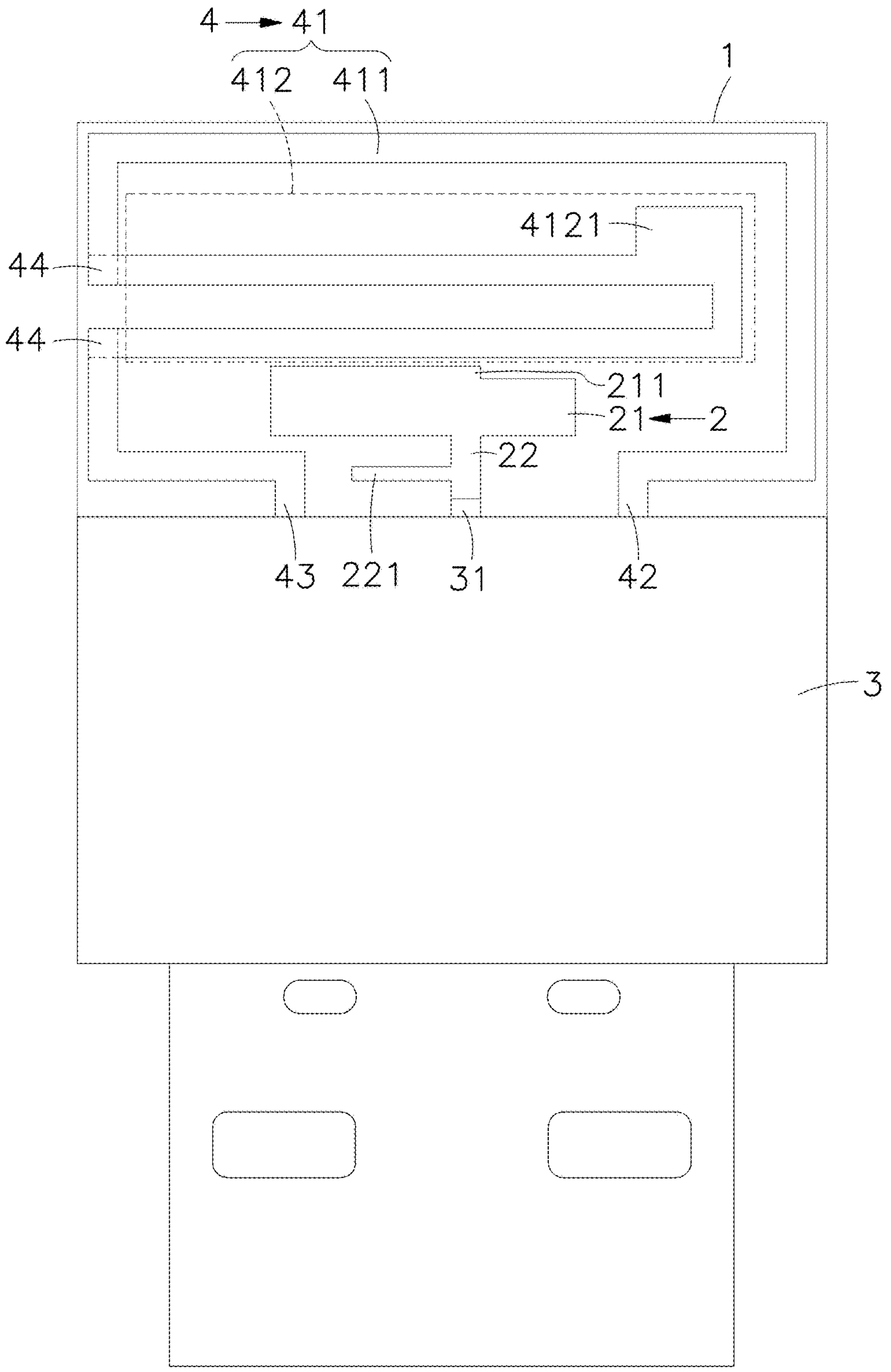
FIG. 1 is a diagram showing an embodiment of the antenna of the present invention.
Figure 2:
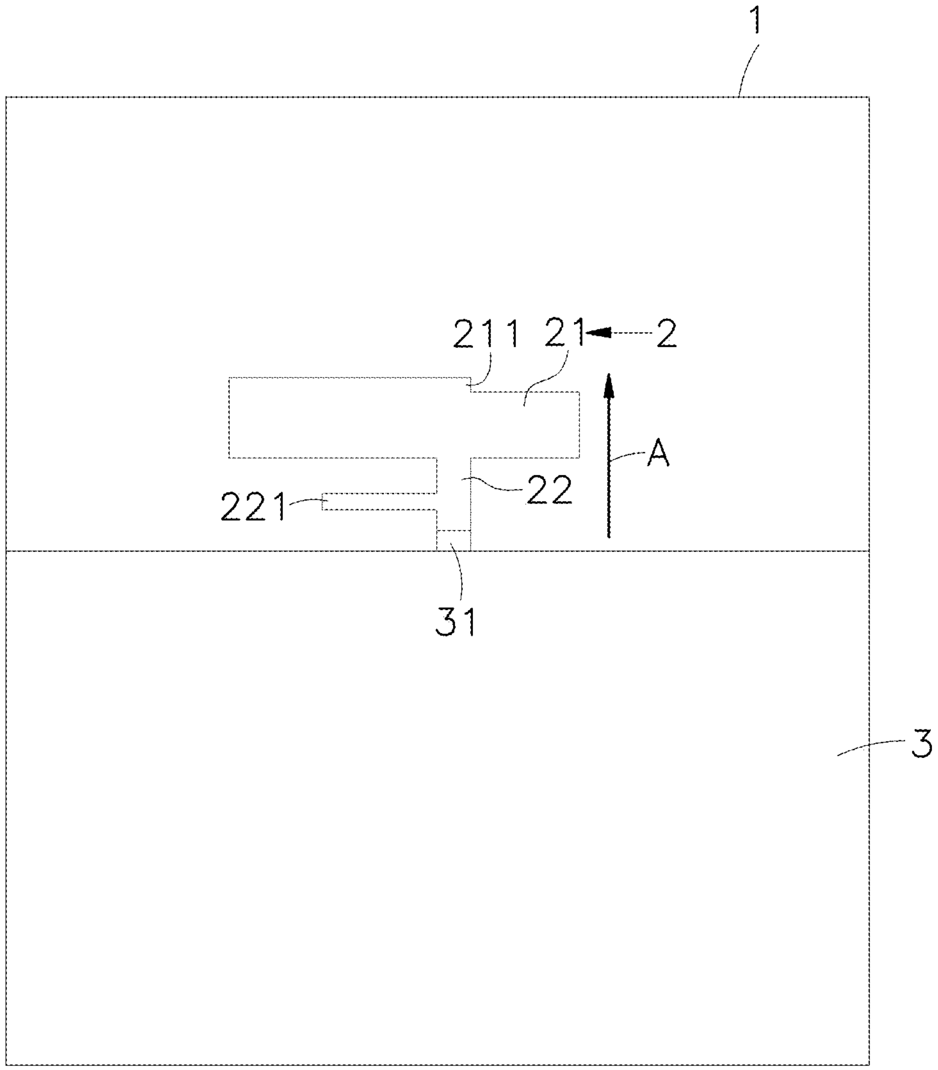
FIG. 2 is a schematic diagram of the high-frequency signal transmission path of the present invention.
Figure 3:
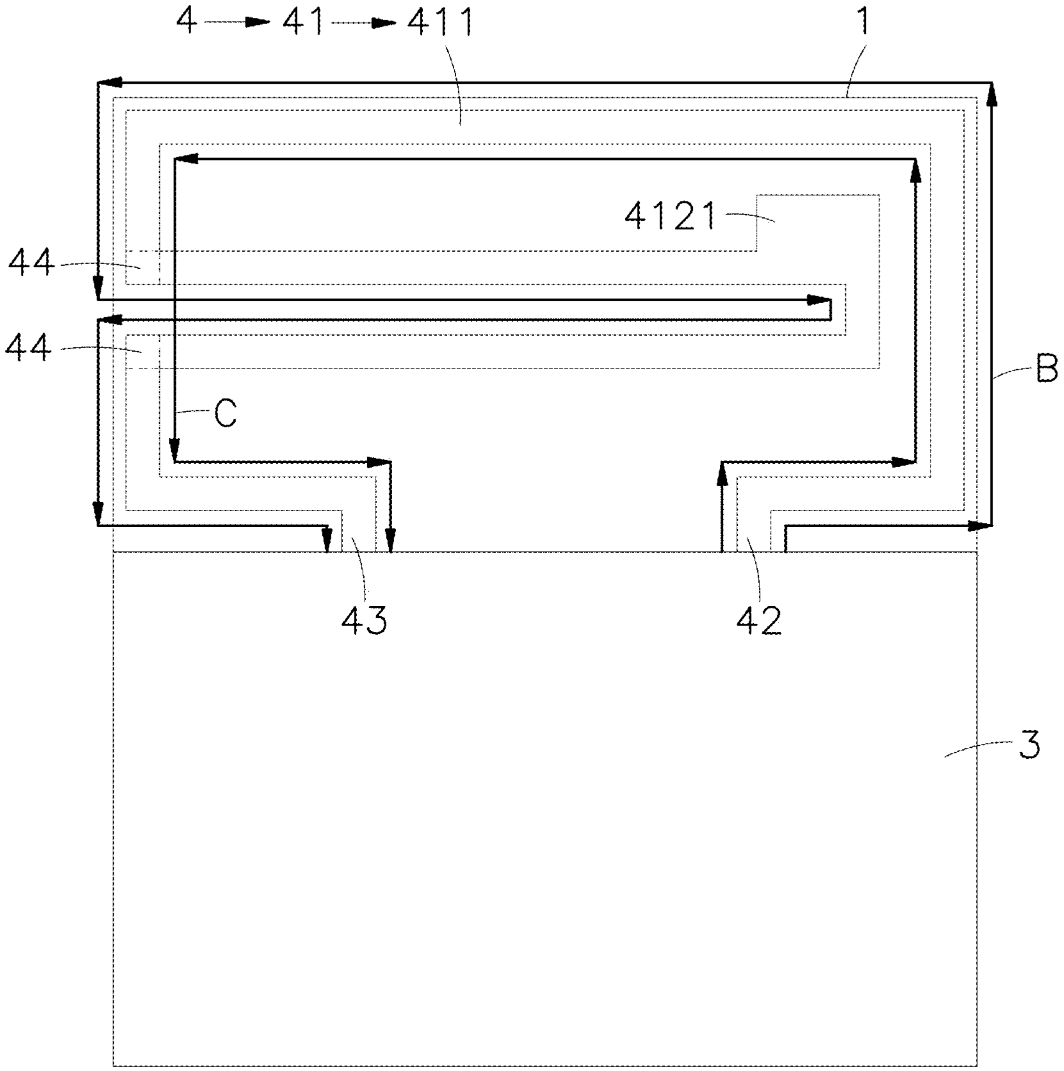
FIG. 3 is a schematic diagram of the medium/low frequency signal transmission path of the present invention.

Please refer to FIGS. 1-3, which are respectively a diagram showing an embodiment of the antenna of the present invention, a schematic diagram of the high-frequency signal transmission path of the present invention and a schematic diagram of the medium/low frequency signal transmission path of the present invention. As can be clearly seen from the figures, the miniaturized multi-band and broadband antenna of the present invention mainly comprises a carrier 1, a signal line 2, a grounding area 3 and a loop grounding line 4. Its main components and features are described in detail as follows:

The carrier 1 refers to a flat printed circuit board (PCB), a plastic board, or a three-dimensional metal antenna formed by metal wire cutting, and the carrier 1 is attached to a wireless electronic device (for example, a wireless network card with an external USB interface (Wi-Fi USB dongle). However, the present invention is not limited thereto; any wireless electronic device using a Wi-Fi wireless interface is an illustrative embodiment of the present invention.

The signal line 2 is in an asymmetric T-shape and is formed on the carrier 1. The signal line 2 comprises a high frequency radiation portion 21, and a first signal line 22 extending from the high frequency radiation portion 21 and coupled to the grounding area 3, so that a feed point 31 for welding a preset cable (not shown) is formed at the coupling location.

The loop grounding line 4 is formed on the carrier 1. The loop grounding line 4 comprises a multi-turn low/medium frequency radiation portion 41, which surrounds the signal line 2 and comprises an outer loop transmission path 411 and an inner loop transmission path 412 located on one side of the outer loop transmission path 411 and extending inwardly, and a second signal line 42 and a third signal line 43 respectively located at two ends of the outer loop transmission path 411 and coupled to the grounding area 3. The loop grounding line 4 surrounds the signal line 2 to form a co-planar waveguide feeding (CPW feeding-point) monopole antenna having dipole antenna characteristics.

As shown in FIG. 2, the top side of the high frequency radiation portion 21 of the signal line 2 has a top-loading portion 211 that can adjust the impedance matching and bandwidth of the high-frequency resonant frequency band, and the top-loading portion 211 is a narrow rectangular structure. The first signal line 22 of the signal line 2 extends vertically to have an open stub 221 for adjusting impedance matching and bandwidth of the high-frequency resonant frequency band. The high-frequency signal transmission path A is from the first signal line 22 to the high frequency radiation portion 21.

The inner loop transmission path 412 of the loop grounding line 4 has an adjustment area 4121 capable of adjusting the impedance matching and the bandwidth of the low-frequency resonant frequency band, and the adjustment area 4121 has a rectangular structure.

Please refer to FIGS. 1 and 3. The low-frequency signal transmission path B of the loop grounding line 4 completes the low-frequency signal transmission via the second signal line 42, the outer loop transmission path 411 approximately in the shape of a "⊓", the inner loop transmission path 412 approximately in the shape of an inverted "C", and the third signal line 43 in sequence. The medium-frequency signal transmission path C of the loop grounding line 4 completes the medium frequency signal transmission via the second signal line 42, the outer loop transmission path 411 approximately in the shape of a "⊓", and the third signal line 43 in sequence. A radiation guide point 44 is formed at each of the two intersections of the outer loop transmission path 411 and the inner loop transmission path 412. Wireless signal hopping is transmitted through the two radiation guide points 44 to form electronic signal transmission in the outer loop transmission path 411 without passing through the inner loop transmission path 412.

The signal line 2 is formed between the two side lines of the outer loop transmission path 411 and in the space formed below the inner loop transmission path 412. The first signal line 22, the second signal line 42 and the third signal line 43 are coupled with the grounding area 3 to form a co-planar waveguide feed. The first signal line 22 forms a live wire that is charged and the second signal line 42 and the third signal line 43 form a ground wire that is not charged. The signal feeding structure of the aforementioned antenna adopts a symmetrical (or asymmetrical) co-planar waveguide feeding method. At the signal input end of the antenna, the loop grounding line 4 is used to surround signal line 2, thereby increasing the working bandwidth of the antenna.

The length of the signal line 2 is one quarter wavelength (λ/4) of the center frequency of the high frequency band; and the length of the loop grounding line 4 is one quarter wavelength (λ/4) of the center frequency of the low frequency band.

The low frequency operating band of the planar monopole loop composite multi-broadband antenna is 2.4~2.5 GHz; the medium frequency operating band is 5.15~5.85 GHz; and the high frequency operating band is 5.925~7.125 GHz.

Figure 4:
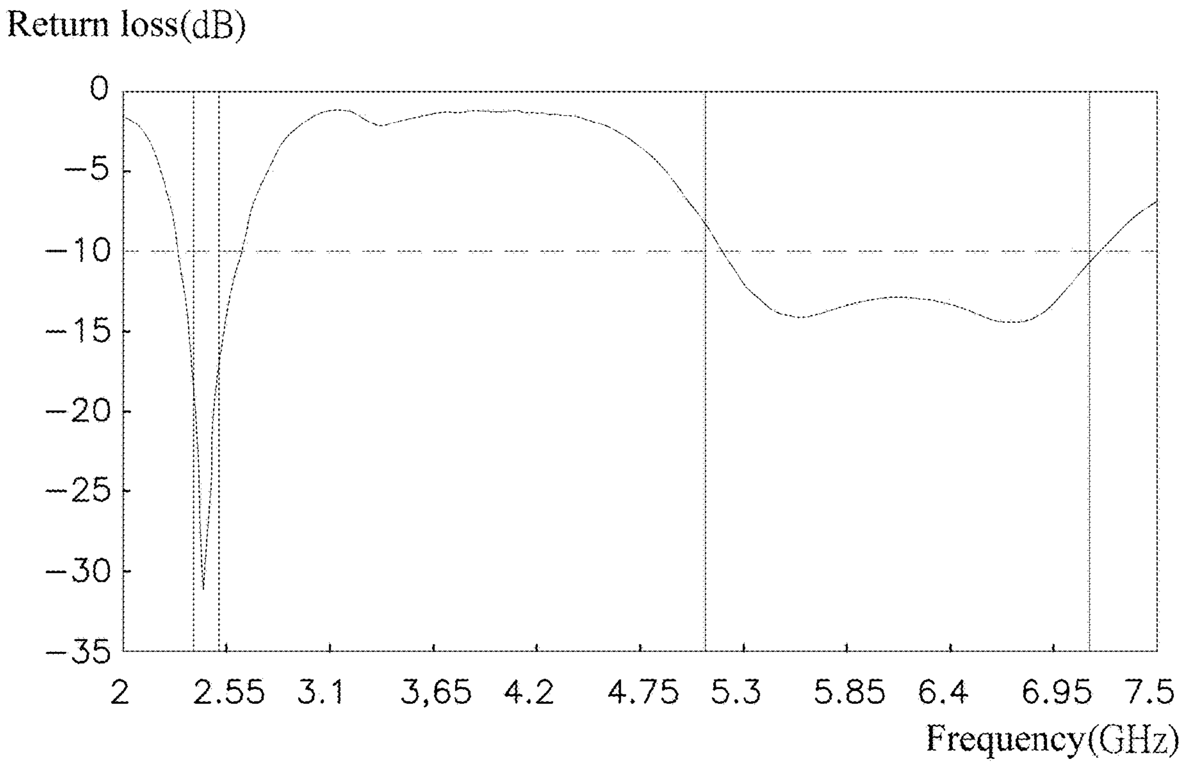
FIG. 4 is an impedance matching diagram of the antenna of the present invention.

Please refer to FIG. 4, which is the impedance matching diagram of the antenna of the present invention. In the Wi-Fi signal frequency band (2.4 GHz~2.5 GHz, 5.15~7.12 GHz), the return loss is lower than −10 dB, which meets the antenna impedance matching characteristics. It is proven that it can be used in Wi-Fi 6E or Wi-Fi 7 wireless electronic devices without generating the problem of return loss where the signal is reflected back to the signal source.

Please refer to Table 1, which is a table showing the 3D radiation efficiency of the antenna of the present invention.

| Frequency (GHz) | 2.4 | 2.45 | 2.5 | 5.15 | 5.5 | 5.85 | 5.925 | 6.5 | 7.125 |
|---|---|---|---|---|---|---|---|---|---|

-continued

| | | | | | | | | | |
|---|---|---|---|---|---|---|---|---|---|
| Peak Gain (dBi) | 2.79 | 3.26 | 3.73 | 4.76 | 4.42 | 6.07 | 5.62 | 4.59 | 2.89 |
| Efficiency | 52 | 53 | 58 | 58 | 88 | 77 | 69 | 62 | 48 |

The above table 1 is the measured value of the antenna of the present invention. It can be seen that in the usable frequency band of Wi-Fi signal (2.4 GHz~2.5 GHz, 5.15~7.12 GHz), its peak gain range is between 2.79~6.07 dBi, and the efficacy range is between 48~88%. This proves that the antenna design structure disclosed in FIG. 1 fully complies with the specifications of Wi-Fi 6E or Wi-Fi 7 and has good efficiency.

Figure 5:
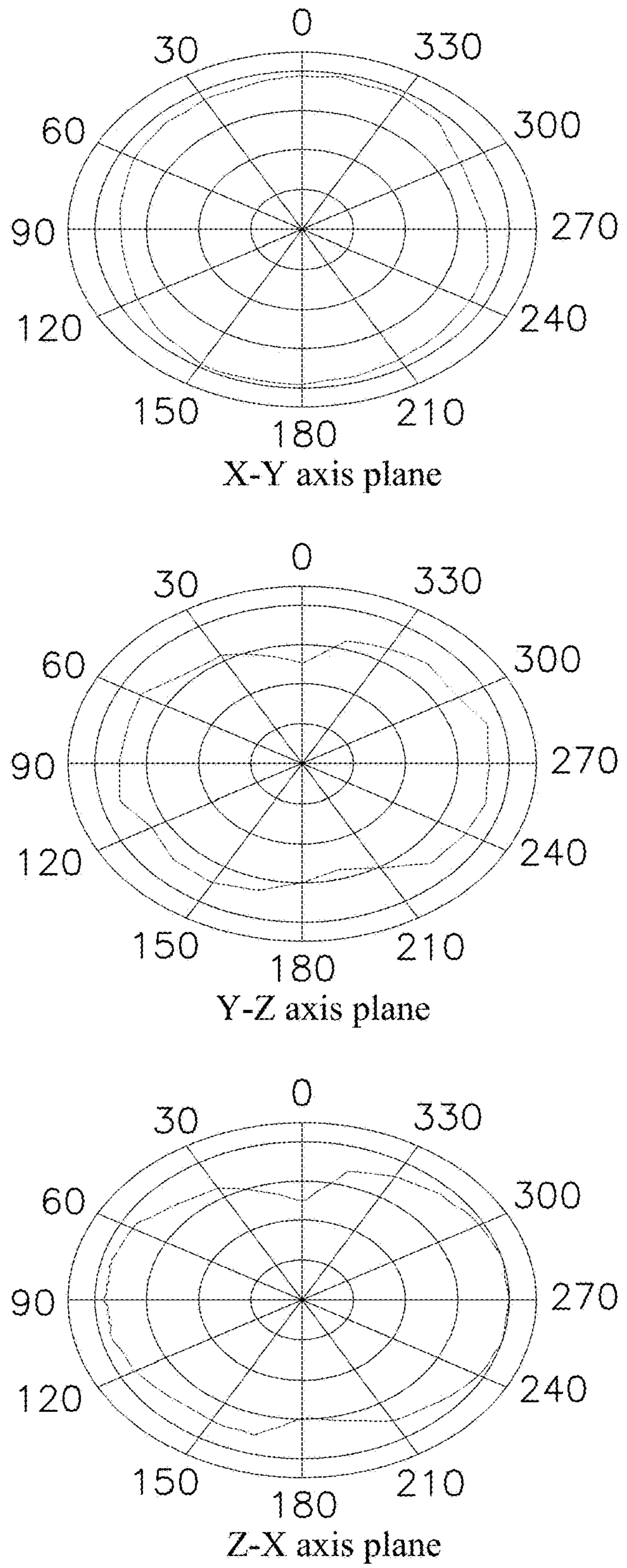
FIG. 5 is a diagram showing the antenna current distribution and radiation pattern of the present invention in the 2.45 GHz frequency band.
Figure 6:
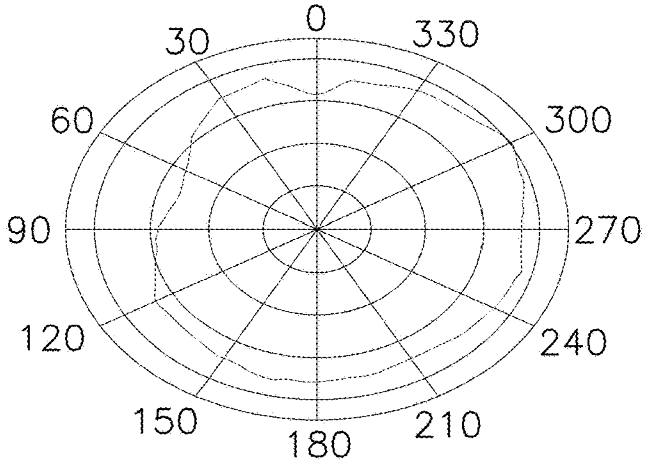
FIG. 6 is a diagram showing the antenna current distribution and radiation pattern of the present invention in the 5.5 GHz frequency band.
Figure 6:
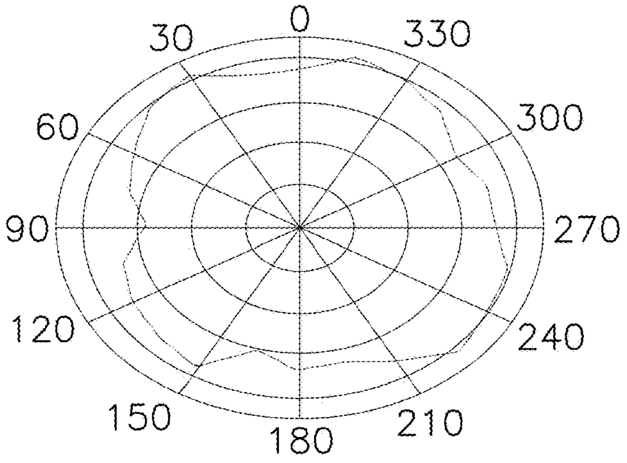
Figure 6:
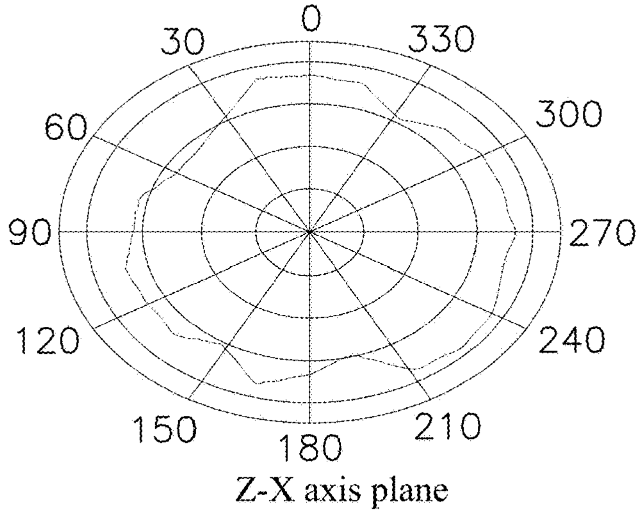
Figure 7:
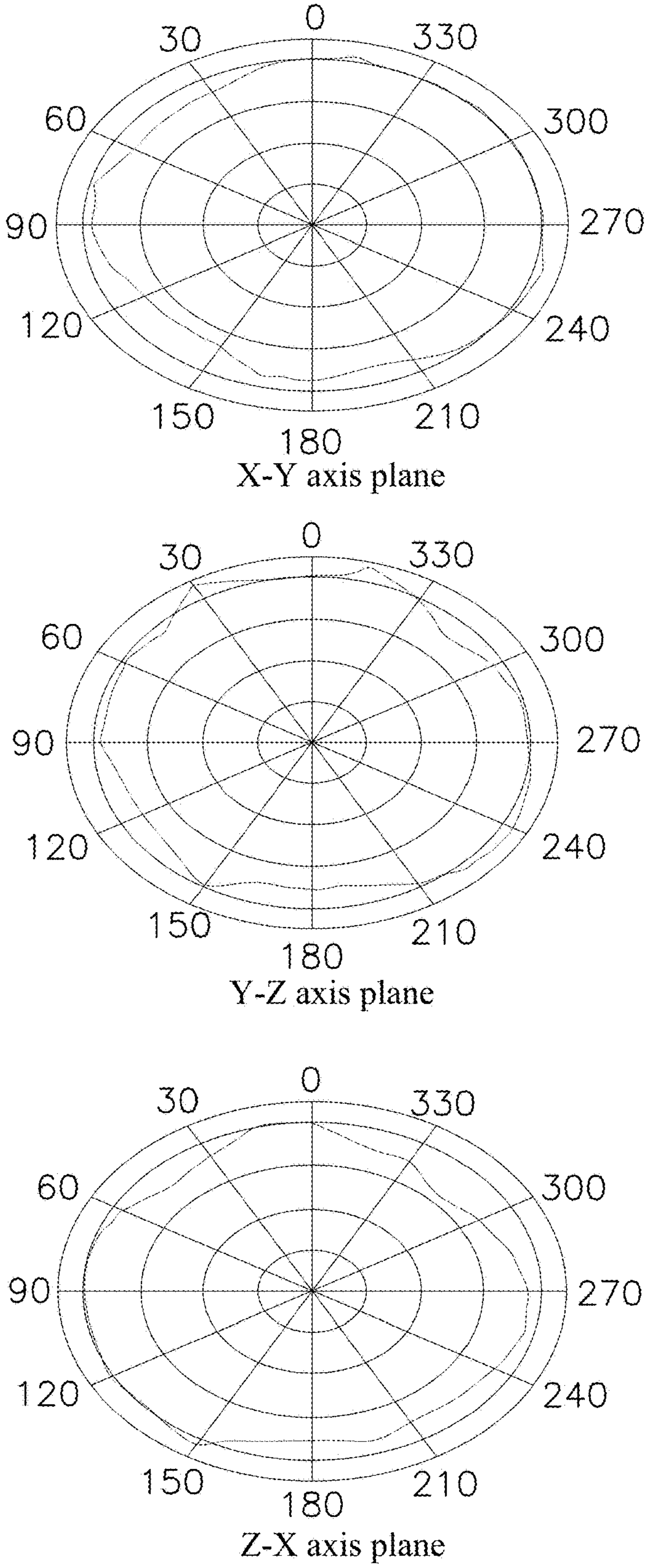
FIG. 7 is a diagram showing the antenna current distribution and radiation pattern of the present invention in the 6.5 GHz frequency band.

Please refer to FIGS. 5 to 7, which are the antenna current distribution and radiation pattern diagrams of the present invention in the 2.45 GHz frequency band, 5.5 GHz frequency band and 6.5 GHz frequency band, wherein FIG. 5 is a representative diagram of the low frequency operating band; FIG. 6 is a representative diagram of the medium frequency operating band; and FIG. 7 is a representative diagram of the high frequency operating band. The loop grounding line 4 of the present invention surrounds the signal line 2 to form a monopole antenna with a co-planar waveguide feed (CPW feeding-point) and has the characteristics of a dipole antenna. The upper graph of the dipole antenna characteristics represents the power intensity (dB) of electromagnetic wave radiation in the X-Y axis plane at angles from 0° to 360°; the middle graph represents the power intensity (dB) of electromagnetic wave radiation in the Y-Z axis plane at an angle of 0° to 360°; the lower graph represents the power intensity (dB) of electromagnetic wave radiation in the Z-X axis plane at an angle of 0° to 360°. The power intensity in the X-Y axis plane, Y-Z axis plane and Z-X axis plane can all be converted into a 3D stereogram (not shown in the figures), and the 3D stereogram is very close to a spherical shape. This indicates that the electromagnetic wave signal of the antenna of the present invention is extremely stable without any missing corners (missing corners indicate areas where electromagnetic waves cannot radiate, i.e., areas where electromagnetic wave signals are poor). From the overall test graphs in FIGS. 5 to 7, it can be seen that the present invention has good antenna radiation patterns in the operating frequency bands of 2.4~2.5 GHz (low frequency band), 5.15~5.85 GHz (medium frequency band) and 5.925~7.125 GHz (high frequency band).

The planar monopole loop composite multi-broadband antenna of the present invention has the following advantages:

(1) The antenna structure can be simple and the performance can be good. The antenna can be materialized by various methods such as using a flat printed circuit board, a plastic board, or a three-dimensional antenna formed by metal wire cutting.

(2) The antenna has a single feed structure with a co-planar waveguide, and the ground wire is designed as a loop that surrounds the monopole signal line to achieve broadband multi-band performance.

(3) By facilitating the formation of a versatile antenna structure, it is possible to achieve good antenna radiation performance when the space in which the antenna can be installed is limited.

(4) The applicable frequency range is extremely wide, ranging from MHz level to mmWave level.

The above is only a preferred embodiment of the present invention, and does not limit the patent scope of the present invention. Therefore, all simple modifications and equivalent structural changes made by using the contents of the description and drawings of the present invention should be included in the patent scope of the present invention and should be declared.

In summary, the planar monopole loop composite multi-broadband antenna of the present invention can achieve its effect and purpose when used. Therefore, this invention is truly an invention with excellent practicality. In order to meet the application requirements for invention patents, we have filed an application in accordance with the law. We hope that the review committee will approve this case as soon as possible to protect the inventor's hard work in research and development. If the review committee has any questions, please feel free to write to us for instructions. The inventor will do his best to cooperate and we will be very grateful.

What the invention claimed is:

1. A planar monopole loop composite multi-broadband antenna, comprising:

a carrier;

a signal line in an asymmetric T-shape formed on said carrier, said signal line comprising a high frequency radiation portion and a first signal line extending from said high frequency radiation portion and coupled to a grounding area, so that a feed point for welding a preset cable is formed at the coupling location; and a loop grounding line formed on said carrier, said loop grounding line comprising a multi-turn low/medium frequency radiation portion, which surrounds said signal line and comprises an outer loop transmission path and an inner loop transmission path located on one side of said outer loop transmission path and extending inwardly, and a second signal line and a third signal line respectively located at two ends of said outer loop transmission path and coupled to said grounding area, said loop grounding line surrounding said signal line to form a co-planar waveguide feeding monopole antenna having dipole antenna characteristics.

2. The planar monopole loop composite multi-broadband antenna as claimed in claim 1, wherein said carrier refers to a flat printed circuit board, a plastic board or a three-dimensional metal antenna.

3. The planar monopole loop composite multi-broadband antenna as claimed in claim 1, wherein said high frequency radiation portion of said signal line comprises a top-loading portion on a top side thereof capable of adjusting impedance matching and bandwidth of a high-frequency resonant frequency band, said top-loading portion being in a narrow rectangular structure.

4. The planar monopole loop composite multi-broadband antenna as claimed in claim 1, wherein said first signal line of said signal line extends in a vertical direction and has an open stub capable of adjusting impedance matching and bandwidth of a high-frequency resonant frequency band.

5. The planar monopole loop composite multi-broadband antenna as claimed in claim 1, wherein said inner loop transmission path of said loop grounding line has an adjustment area capable of adjusting impedance matching and band width of a low-frequency resonant frequency band, said adjustment area being in a rectangular structure.

6. The planar monopole loop composite multi-broadband antenna as claimed in claim 1, wherein said loop grounding line has low-frequency signal transmission path that completes low-frequency signal transmission via said second signal line, said outer loop transmission path approximately in the shape of a "⊓", said inner loop transmission path approximately in the shape of an inverted letter "C", and said third signal line in sequence.

7. The planar monopole loop composite multi-broadband antenna as claimed in claim 1, wherein said loop grounding line has an medium-frequency signal transmission path that completes medium frequency signal transmission via said second signal line, said outer loop transmission path in the shape of a "⊓" and said third signal line in sequence; a radiation guide point is formed at each of the two intersections of said outer loop transmission path and said inner loop transmission path, so that wireless signal hopping is transmitted through said two radiation guide points to form electronic signal transmission in said outer loop transmission path beyond said inner loop transmission path.

8. The planar monopole loop composite multi-broadband antenna as claimed in claim 1, wherein said signal line is formed between two side lines of said outer loop transmission path and in a space formed below said inner loop transmission path; said first signal line, said second signal line and said third signal line are coupled with said grounding area to form a co-planar waveguide feed, said first signal line forms a live wire that is charged and said second signal line and said third signal line form a ground wire with no charge.

9. The planar monopole loop composite multi-broadband antenna as claimed in claim 1, wherein length of said signal line is one quarter of a center frequency of a high frequency band; and a length of said loop grounding line is one quarter of a center frequency of a low frequency band.

10. The planar monopole loop composite multi-broadband antenna as claimed in claim 1, which has a low-frequency operating band of 2.4 to 2.5 GHz, a medium-frequency operating band of 5.15 to 5.85 GHz, and a high-frequency operating band of 5.925 to 7.125 GHz.

* * * * *